US008650490B2

(12) United States Patent  
Hourselt et al.

(10) Patent No.: US 8,650,490 B2  
(45) Date of Patent: Feb. 11, 2014

(54) APPARATUS AND METHODS FOR DISPLAYING A PHYSICAL VIEW OF A DEVICE

(75) Inventors: Andrew Gary Hourselt, Tucson, AZ (US); Kelly Louise Hicks, Tucson, AZ (US); Teresa Shen Swingler, Tucson, AZ (US); Nedzad Taljanovic, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1284 days.

(21) Appl. No.: 12/047,199

(22) Filed: Mar. 12, 2008

(65) Prior Publication Data

US 2009/0231350 A1    Sep. 17, 2009

(51) Int. Cl.
*G06T 1/60*    (2006.01)

(52) U.S. Cl.
USPC ........... 715/734; 715/736; 715/771; 715/823; 715/967

(58) Field of Classification Search
USPC ................... 715/734, 736, 967, 823
See application file for complete search history.

(56) References Cited

U.S. PATENT DOCUMENTS

| | | | | |
|---|---|---|---|---|
| 5,276,877 A * | 1/1994 | Friedrich et al. | ............. | 718/105 |
| 5,682,487 A * | 10/1997 | Thomson | ............. | 715/800 |
| 5,861,882 A * | 1/1999 | Sprenger et al. | ............. | 715/700 |
| 5,887,193 A * | 3/1999 | Takahashi et al. | ............. | 710/8 |
| 5,890,204 A | 3/1999 | Ofer et al. | | |
| 6,115,041 A | 9/2000 | Dang et al. | | |
| 6,253,240 B1 | 6/2001 | Axberg et al. | | |
| 6,269,398 B1 * | 7/2001 | Leong et al. | ............. | 709/224 |
| 6,384,842 B1 | 5/2002 | DeKoning et al. | | |
| 6,446,966 B1 * | 9/2002 | Crozier | ............. | 273/236 |
| 6,609,034 B1 * | 8/2003 | Behrens et al. | ............. | 700/19 |
| 6,610,102 B1 * | 8/2003 | Aldred et al. | ............. | 715/234 |
| 6,639,893 B1 * | 10/2003 | Chikenji et al. | ............. | 370/217 |
| 6,779,027 B1 * | 8/2004 | Schunicht et al. | ............. | 709/223 |
| 6,813,037 B1 * | 11/2004 | Collard | ............. | 358/1.15 |
| 6,825,860 B1 * | 11/2004 | Hu et al. | ............. | 715/801 |
| 6,829,513 B2 * | 12/2004 | Piersanti et al. | ............. | 700/83 |
| 7,043,605 B2 * | 5/2006 | Suzuki | ............. | 711/114 |
| 7,055,105 B2 * | 5/2006 | Windl et al. | ............. | 715/769 |
| 7,072,986 B2 | 7/2006 | Kitamura et al. | | |
| 7,221,357 B2 * | 5/2007 | Von Essen et al. | ............. | 345/173 |
| 7,236,987 B1 * | 6/2007 | Faulkner et al. | ............. | 1/1 |
| 7,266,638 B2 * | 9/2007 | Coppock et al. | ............. | 711/114 |
| 7,290,168 B1 * | 10/2007 | DeKoning | ............. | 714/5.11 |
| 7,290,182 B2 * | 10/2007 | Windl | ............. | 714/57 |
| 7,383,381 B1 * | 6/2008 | Faulkner et al. | ............. | 711/114 |
| 7,430,568 B1 * | 9/2008 | DeKoning et al. | ............. | 1/1 |
| 7,437,505 B2 * | 10/2008 | Chew | ............. | 711/112 |
| 7,441,083 B2 * | 10/2008 | Suzuki et al. | ............. | 711/114 |
| 7,447,939 B1 * | 11/2008 | Faulkner et al. | ............. | 714/6.13 |
| 7,512,894 B1 * | 3/2009 | Hintermeister et al. | ............. | 715/771 |

(Continued)

*Primary Examiner* — Daeho Song
(74) *Attorney, Agent, or Firm* — Kunzler Law Group

(57) ABSTRACT

An apparatus and methods are disclosed for displaying a physical view of a monitored device. The apparatus for displaying a physical view of a device is provided with a plurality of modules configured to functionally execute the steps of displaying a physical representation of a device, generating a plurality of grid lines in association with a predetermined portion of the physical representation of the device, and displaying an icon configured to convey information regarding a status of the device, wherein the icon is displayed within an area defined by the plurality of grid lines. These modules in the described embodiments include a rendering module, a grid module, and a status module.

18 Claims, 6 Drawing Sheets

(56) References Cited

U.S. PATENT DOCUMENTS

| | | |
|---|---|---|
| 7,519,909 B2* | 4/2009 | Kuiawa et al. ............... 715/736 |
| 7,526,568 B1* | 4/2009 | Swanton et al. ............. 709/239 |
| 7,647,126 B2* | 1/2010 | Blevins et al. ................ 700/49 |
| 7,667,668 B2* | 2/2010 | Domi et al. ................... 345/2.2 |
| 7,669,139 B2* | 2/2010 | Hintermeister et al. ...... 715/771 |
| 7,689,391 B2* | 3/2010 | Cochran et al. ............... 703/6 |
| 7,715,929 B2* | 5/2010 | Skourup et al. ............... 700/17 |
| 7,852,337 B2* | 12/2010 | Archer et al. ................. 345/440 |
| 2001/0035880 A1* | 11/2001 | Musatov et al. .............. 345/764 |
| 2002/0035620 A1* | 3/2002 | Takahashi et al. ............ 709/220 |
| 2002/0135859 A1* | 9/2002 | Haga ............................. 359/296 |
| 2002/0145770 A1* | 10/2002 | Nomura et al. ............... 358/505 |
| 2002/0175938 A1 | 11/2002 | Hackworth |
| 2002/0190946 A1* | 12/2002 | Metzger ........................ 345/156 |
| 2003/0001883 A1* | 1/2003 | Wang ............................ 345/736 |
| 2003/0033550 A1* | 2/2003 | Kuiawa et al. ................ 713/340 |
| 2003/0095123 A1* | 5/2003 | Hahn ............................ 345/440 |
| 2004/0073854 A1* | 4/2004 | Windl ........................... 714/57 |
| 2004/0107085 A1* | 6/2004 | Moosburger et al. ......... 703/13 |
| 2004/0243778 A1 | 12/2004 | Barrios et al. |
| 2004/0243945 A1 | 12/2004 | Benhase et al. |
| 2005/0021291 A1* | 1/2005 | Retlich et al. ................ 702/182 |
| 2005/0034012 A1 | 2/2005 | Bartlett et al. |
| 2005/0055641 A1* | 3/2005 | Machida ....................... 715/734 |
| 2005/0096872 A1* | 5/2005 | Blevins et al. ................ 702/183 |
| 2006/0178864 A1* | 8/2006 | Khanijo et al. ............... 703/20 |
| 2006/0190768 A1* | 8/2006 | Kawase ......................... 714/31 |
| 2006/0241793 A1* | 10/2006 | Skourup et al. ............... 700/83 |
| 2006/0250352 A1* | 11/2006 | Fairs et al. .................... 345/156 |
| 2007/0025195 A1 | 2/2007 | Oh et al. |
| 2007/0028137 A1 | 2/2007 | Chen |
| 2007/0283389 A1* | 12/2007 | Hallberg ....................... 725/37 |
| 2007/0294212 A1* | 12/2007 | Ozaki et al. .................. 707/1 |
| 2008/0016466 A1* | 1/2008 | Grasser et al. ................ 715/835 |
| 2008/0028338 A1* | 1/2008 | Kodosky et al. .............. 715/835 |
| 2008/0201657 A1* | 8/2008 | Archer et al. ................. 715/771 |
| 2009/0059103 A1* | 3/2009 | Azor et al. .................... 349/8 |
| 2009/0089714 A1* | 4/2009 | Blake et al. ................... 715/850 |

* cited by examiner ated device.

APPARATUS AND METHODS FOR DISPLAYING A PHYSICAL VIEW OF A DEVICE

BACKGROUND OF THE INVENTION

1. Field of the Invention

This invention relates to monitoring of electronic devices and more particularly relates to displaying a physical view of an electronic device.

2. Description of the Related Art

Complex information systems commonly include several devices, each working together to provide various data storage, communication, and processing services. Such systems are commonly used for business. Where such systems are involved in business and financial transactions, reliability is typically a particular concern for system administrators. If an error occurs on such a system, there may be a substantial financial impact to the company.

Commonly, system administrators use system monitoring applications to measure the availability and to ensure the accessibility of the information system resources. Monitoring applications commonly use Simple Network Management Protocol (SNMP) ping packets and other network monitoring commands to monitor responsiveness of the various system resources.

Common applications may provide an abstract graphical display of the network indicating the status of the various resources. For example, a network monitoring application may assign a box or circle called a "node" to represent a resource in the network. Commonly, such nodes are colored to indicate the status of the resource. For example, a green node may indicate that the resource is available, and a red node may indicate that the network management application cannot access the resource.

However, typical monitoring applications do not provide a physical description of the monitored device. Furthermore, monitoring applications also generally do not provide information regarding the physical location within a large system of the monitored device.

Typically, monitoring systems only collect data about the accessibility of the system resources. Additionally, monitoring systems do not provide a system administrator with information about the physical location or physical configuration of the system resources within the system.

SUMMARY OF THE INVENTION

From the foregoing discussion, it should be apparent that a need exists for an apparatus and methods that display a physical view of a monitored device.

The present invention has been developed in response to the present state of the art, and in particular, in response to the problems and needs in the art that have not yet been fully solved by currently available device monitoring applications. Accordingly, the present invention has been developed to provide an apparatus and methods for displaying a physical view of a device that overcome many or all of the above-discussed shortcomings in the art.

The apparatus for displaying a physical view of a device is provided with a plurality of modules configured to functionally execute the necessary steps of displaying a physical representation of a device, generating a plurality of grid lines in association with a predetermined portion of the physical representation of the device, and displaying an icon configured to convey information regarding a status of the device, wherein the icon is displayed within an area defined by the plurality of grid lines. These modules in the described embodiments include a rendering module, a grid module, and a status module.

In a further embodiment, the physical view of the device also includes a plurality of display layers, wherein the rendering module is configured to display the physical representation of the device in a first display layer, and the status module is configured to display the icon in the first display layer. The apparatus may also include an event capture module configured to highlight a portion of a second display layer in response to a user selection, the portion of the second display layer corresponding to an area defined by a selected group of grid lines.

In a further embodiment, the event capture module may display a device description in response to detecting a first selection event in the area defined by the selected group of grid lines. Additionally, the event capture module may include an interface module configured to display a device interface in response to detecting a second selection event in the area defined by the selected group of grid lines.

The device interface may also include a query panel configured to display a response from the device to an information query. In a further embodiment, the device interface also includes a control panel configured to display a selectable control configured to manage communication of data to the device.

A method of the present invention is also presented for displaying a physical view of a device. The method in the disclosed embodiments substantially includes the steps necessary to carry out the functions presented above with respect to the operation of the described apparatus. In particular, the method may include displaying a physical representation of a device, generating a plurality of grid lines in association with a predetermined portion of the physical representation of the device, and displaying an icon configured to convey information regarding a status of the device, wherein the icon is displayed within an area defined by the plurality of grid lines.

The method may also include displaying the physical representation of the device and the plurality of grid lines in a first display layer, and displaying the icon in a second display layer. In a further embodiment, the method includes highlighting a portion of the second display layer in response to a user selection, the portion of the second display layer corresponding to an area defined by a selected group of grid lines.

In a further embodiment, the method may include displaying a device description in response to detecting a first selection event in the area defined by the selected group of grid lines. The method may also include displaying a device interface in response to detecting a second selection event in the area defined by the selected group of grid lines.

In still another embodiment, the method includes displaying a response from the device to an information query. The method may further include displaying a selectable control configured to manage communication of data to the device.

A computer program product comprising a computer readable medium having computer usable program code executable to perform operations is also presented for displaying a physical view of a device. The operations of the computer program product may include operations substantially as described above with reference to the described method and apparatus.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
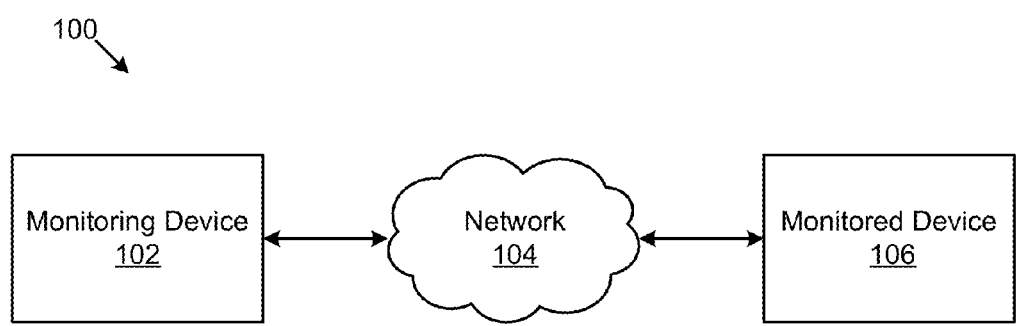
FIG. 1 is a schematic block diagram illustrating one embodiment of a system for monitoring a device.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts one embodiment of a system 100 for monitoring a device 106. In the depicted embodiment, the system 100 includes a monitoring device 102 and a monitored device 106. The monitoring device 102 and the monitored device 106 may be coupled in data communication through a network 104. In an alternative embodiment, the monitoring device 102 may communicate with the monitored device 106 through a computer bus, wireless connection, or other data communication means. Specifically, the monitored device 106 may be local to the monitoring device 102 rather than coupled to the monitoring device 102 through the network 104.

In one embodiment, the monitoring device 102 may include an application server or workstation in communication with the network 104. The monitoring device 102 may host a network monitoring application configured to collect status information, configuration information, and availability statistics from the monitored device 106. Further embodiments of the monitoring application are described below with reference to FIGS. 2-6. In a particular embodiment described in FIGS. 3 and 4, the monitoring application may include a graphical or pictorial rendering of the monitored device 106.

The monitored device 106 may include various components of a computer or network. For example, a monitored device 106 may include a hard drive in an array of hard drives. Alternatively, the monitored device 106 may include a computer processor. In another alternative embodiment, the monitored device 106 may include a network router, switch, or hub. In still another embodiment, the monitored device 106 may include an application server or a data server. One of ordinary skill in the art of computer and network monitoring may recognize other potential devices or even software applications that may require monitoring from a monitoring device 102.

Figure 2:
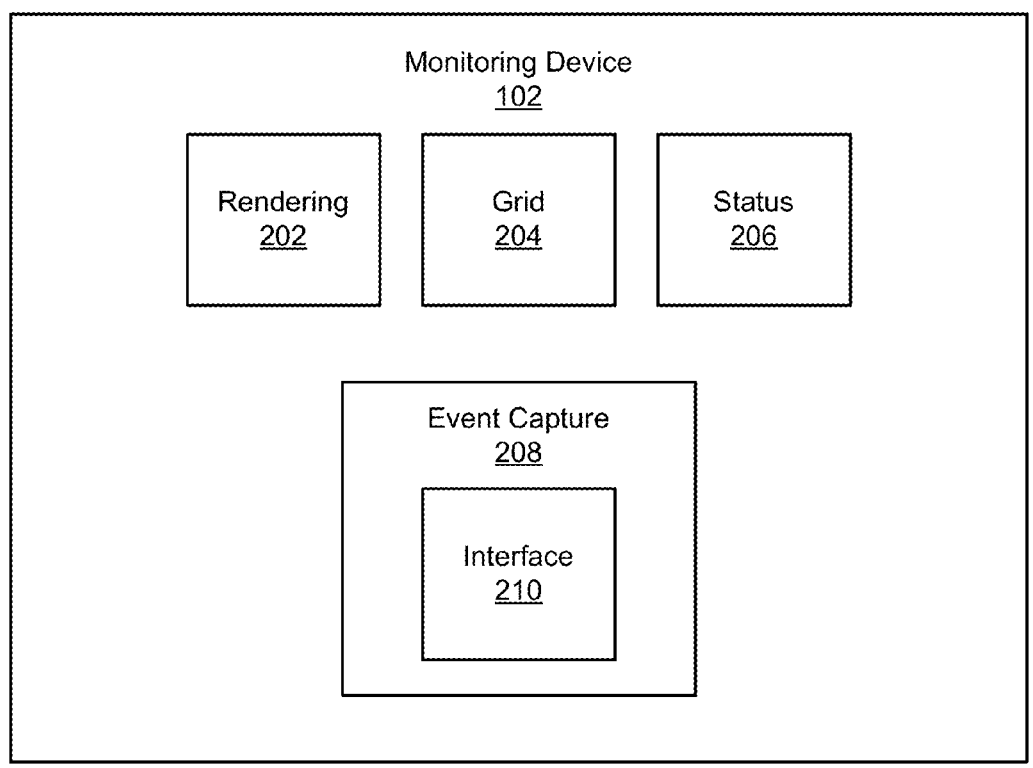
FIG. 2 is a schematic block diagram illustrating one embodiment of an apparatus for displaying a physical view of a device.

FIG. 2 illustrates one embodiment of a monitoring device 102. In the depicted embodiment, the monitoring device 102 includes a rendering module 202, a grid module 204 and a status module 206. The monitoring device 102 may additionally include an event capture module 208. The event capture module 208 may further include an interface module 210. One of ordinary skill in the art will recognize that the monitoring device 102 may include additional components that are not illustrated. Such components may include data storage, data processing, and data communication components.

In one embodiment, the rendering module 202 is configured to display a physical representation of the monitored device 106. For example, if the monitored device 106 were an array of storage disks held in a rack of storage disk arrays, the rendering module 202 may display a picture of a component rack. The picture may also include several disk arrays mounted within the component rack. In a further embodiment, the picture may include a depiction of one or more storage disks within the disk arrays. The rendering module 202 may display an actual picture of the monitored device 106. Alternatively, the rendering module 202 may display a graphical representation of the monitored device 106, where the physical configuration of the monitored device 106 is accurately depicted. For example, the rendering module 202 may display a graphical model of the monitored device 106.

The grid module 204 may generate one or more grid lines with the physical representation of the monitored device 106. For example, if the monitored device 106 is a storage disk within an array of storage disks, the grid module 204 may generate a group of grid lines that outline the general area of the storage disk. The grid module 204 may further generate a group of grid lines separating one disk array from another disk array, and so on. In one embodiment, the grid module 204 may display the grid lines in a graphical layer that is separate from the graphical layer in which the rendering module 202 displays the physical representation of the monitored device 106. Alternatively, the grid module 204 may draw the grid lines directly on the physical representation of the monitored device 106 so that both the physical representation and the grid lines are displayed in the same graphical layer. In an alternative embodiment, the grid module 204 may not display the grid lines to the user, but maintain information regarding the location of the grid lines and the associated area defined by the intersection of the grid lines.

The status module 206 may display an icon configured to convey information regarding the status of the monitored device 106. For example, the status module 206 may display the icon within an area defined by a group of grid lines displayed by the grid module in a way that the icon indicates the status of a monitored device 106 whose physical representation is contained within an area enclosed by the grid lines. In one embodiment, the icon may include a color or an image that provides some indicia of the status of the monitored device 106. For example, the icon may be green to indicate that the monitored device 106 is operating properly. Alternatively, the icon may include an image of a stop sign or warning sign to indicate that an error has occurred on the monitored device 106. In a further embodiment, the status icon may convey information regarding a specific characteristic of the monitored device, such as the temperature, uptime, scheduled maintenance dates, or the like.

Although in certain embodiments, the monitoring device 102 may not include the event capture module 208 or the interface module 210, in the depicted embodiment the monitoring device 102 does include these modules. The event capture module 208 may highlight an area enclosed by a group of grid lines in response to a user selection. For example, if a user places a mouse pointer over a grid box, the event capture module 208 may highlight the grid box to indicate that the grid box is selectable or that a further action may be taken with respect to the monitored device 106 associated with the grid box. Indeed, the event capture module 208 may capture a variety of user interactive events. Further embodiments are described below with reference to FIGS. 3 and 4.

In an alternative embodiment, the event capture module 208 may display a device description in response to detecting a selection event in the area defined by the grid box. For example, if a mouse pointer is placed over the grid box associated with a storage disk within a storage array, the event capture module 208 may display a small pop-up window or box that includes a name, location, and/or physical description of the storage disk.

In a further embodiment, the event capture module 208 also includes an interface module 210. In one embodiment, the interface module 210 may display a device interface window or menu in response to detecting a mouse hover over a grid box associated with the monitored device 106. Alternatively, a mouse left click or right click may trigger the interface module 210 to display the device interface. Further embodiments of the device interface are described below with relation to FIG. 4. The event capture module 208 may capture additional user interactive events such as keyboard entries, voice inputs, and the like.

Figure 3:
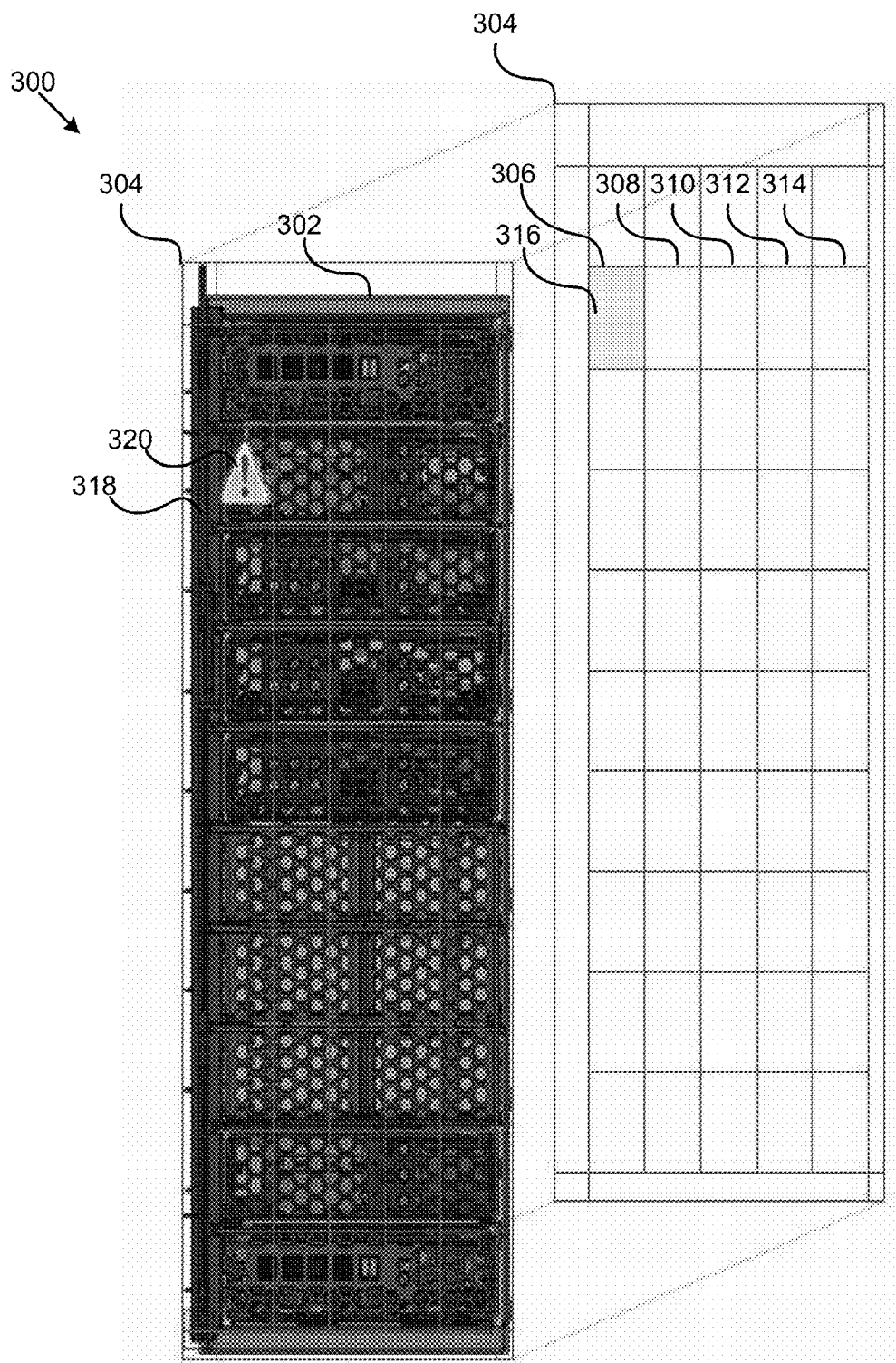
FIG. 3 is a multi-layer view of one embodiment of a physical view of a device.

FIG. 3 illustrates a multi-layer view of one embodiment of physical view 300 of a monitored device 106. In the depicted embodiment, the physical view 300 includes an illustration of several monitored devices 106, including a rack 302 of storage disk arrays 318, each storage disk array including several storage disks.

As illustrated the physical view 300 may include multiple graphical display layers. For example, the rendering module 202 may display the physical representation of the rack 302, the storage disk arrays 318 and the storage disks in a first display layer and the grid module 204 may generate the grid 304 of grid boxes 306-314. The grid boxes 306-314 may be displayed or hidden. In a further embodiment, the display layers may include multiple HyperText Markup Language (HTML) layers displayed one on top of another. In an alternative embodiment, the rendering module 202 and the grid module 204 may display the physical representation and the status icon 320 in the first layer. In such an embodiment, the status module 206 may display the icon 320 in the first layer and the event capture module 208 may display the highlighting 316 and/or the description (not shown) in the second display layer. Various alternative embodiments may include additional layers, or rearranging the order and matching of images in the various display layers.

As illustrated, the grid 304 may include multiple grid lines configured to define an area of the second display layer associated with a monitored device 106. For example, the grid 304 may include multiple grid boxes 306-314. In such an embodiment, grid boxes 306 through 312 may each be associated with a separate storage disk within a storage disk array 318.

Grid box 312 may be associated with a power supply for the storage disk array 318, and grid box 314 may be associated with the entire storage disk array 318.

In such an embodiment, when a mouse pointer is positioned over grid box 306, the event capture module 208 may display a highlight 316 over grid box 306 to indicate that the disk array associated with grid box 306 has been selected. Alternatively, if the mouse pointer is positioned over grid box 314, the event capture module 208 may display a highlight 316 over each of boxes 306-314 to indicate that the entire storage disk array 318 has been selected.

Figure 4:
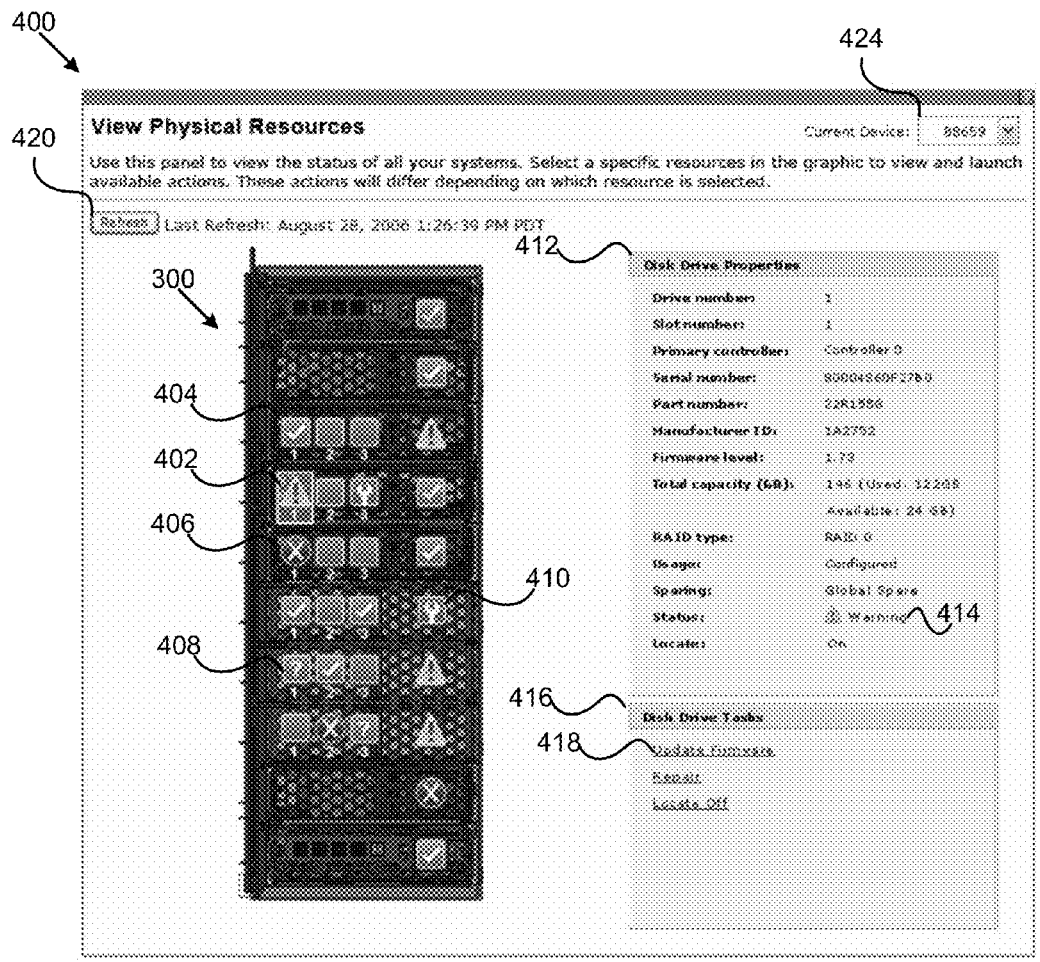
FIG. 4 is a screen-shot view of one embodiment of an application for displaying a physical view of a device.

FIG. 4 is a screen-shot view illustrating one embodiment of a physical view 400 of a monitored device 106 associated with a device monitoring application. In one embodiment, the device monitoring application may include a Graphical User Interface (GUI). In one embodiment, the GUI includes an HTML display that is accessible by a remote user over a network or through a web browser. Alternatively, the GUI may be implemented in JAVA, or the like.

A system administrator may initially configure the device monitoring application by identifying the monitored device 106 and configuration data associated with the monitored device 106. In a specific embodiment, the configuration data may include an image of the monitored device 106 that the rendering module 202 may display as the physical representation in the physical view 300 of the monitored device 106. Additionally, the configuration data may include defining an area of the physical view associated with the monitored device 106 to be defined by the grid lines. The configuration data may also include a network address for the monitored device 106, a Domain Name System (DNS) name for the monitored device 106, or the like.

In one embodiment, the physical view 400 includes the physical view 300 as described above with relation to FIG. 3. Additionally, the physical view 400 may include a query panel 412 and a control panel 416. In a further embodiment, the physical view 400 may include a device selection box 424 and a refresh button 420 for navigating and updating the physical view 400.

In a particular embodiment, the physical view 400 may include several different icons 402-410 to illustrate various operational states of the monitored devices 106. For example, the physical view 400 may include a warning icon 402 to indicate that an error has occurred on the monitored device 106 or any selectable subcomponent. A check icon 404 may indicate that the monitored device 106 is operating properly. An 'X' icon 406 may indicate that the monitored device 106 has failed. A '?' icon 408 may indicate that a monitored device 106 is not reachable, or that the status is unknown. A tool icon 410 may indicate that the monitored device 106 is undergoing a maintenance procedure.

In a further embodiment, the interface module 210 may display a device interface. The device interface may include a query panel 412 and a control panel 416. The query panel 412 may display a response from the monitored device 106 to an information query from the monitoring device 102. For example, the query panel 412 may indicate that the device is in a warning state 414. Additionally, the query panel 412 may display a volume of available storage space on a storage disk, a firmware revision level that is loaded on the monitored device 106, or the like.

The control panel 416 may display a selectable control configured to trigger a communication of data to the monitored device 106. For example, the control panel 416 may include a hyperlink 418 configured to trigger a firmware update operation or a window to allow a system administrator to remotely update the firmware on the monitored device 106.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
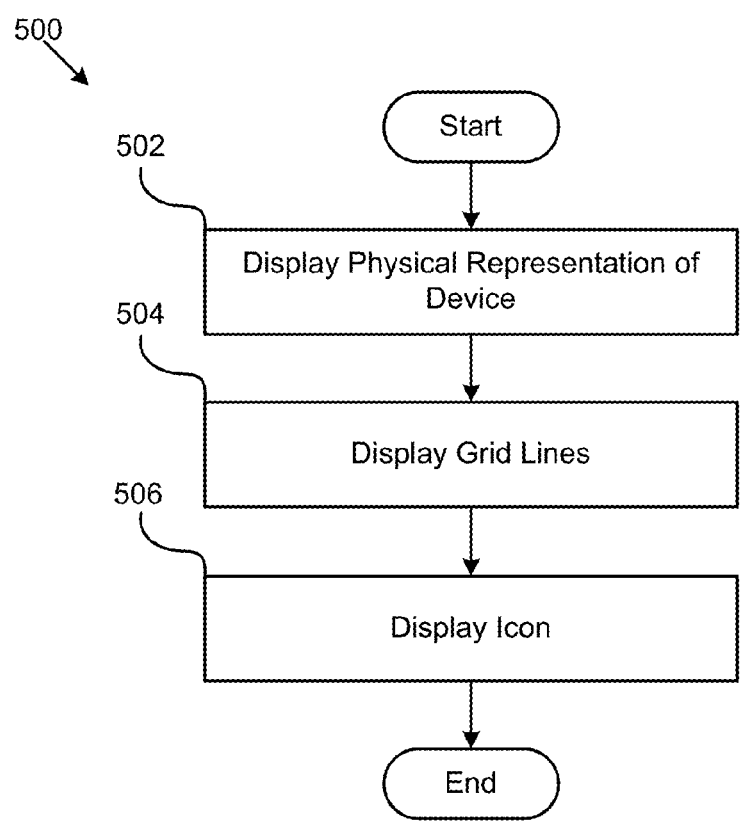
FIG. 5 is a schematic flow chart diagram illustrating one embodiment of a method for displaying a physical view of a device.

FIG. 5 illustrates one embodiment of a method 500 for displaying a physical view 300 of a monitored device 106. In the depicted embodiment, the method 500 starts when the rendering module 202 displays 502 a physical representation 302, 318 of a monitored device 106. The grid module 204 may then display 504 a grid 304 organized to outline or describe a predetermined portion of the physical representation 300 associated with the monitored device 106. The status module 206 may then display 506 an icon 402-410 in a grid box 306-314, where the icon conveys status information associated with the monitored device 106, and the method 500 ends.

Figure 6:
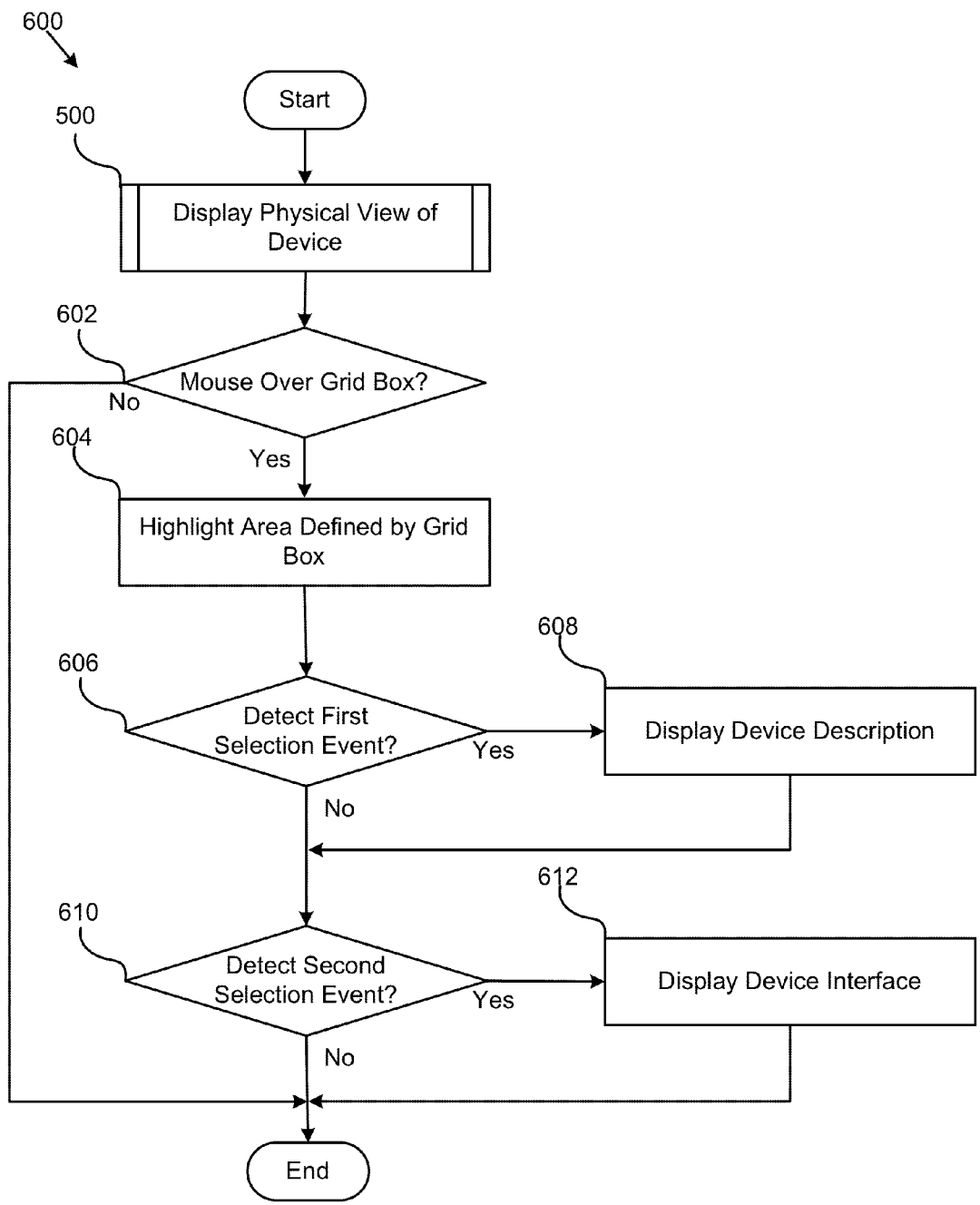
FIG. 6 is a schematic flow chart diagram illustrating a detailed embodiment of a method for displaying a physical view of a device.

FIG. 6 illustrates a further embodiment of a method 600 for displaying a physical view 300 of a monitored device 106. The method starts with displaying 500 the physical view 300 of the monitored device 106 as described above with relation to FIG. 5. Then, the event capture module 208 may determine 602 whether a mouse pointer has been positioned over one of the grid boxes 306-314. If not, the method 600 ends. If so, the event capture module 208 may highlight 604 the area defined by the grid box 306-314. If the event capture module 208 detects 606 a first selection event, the event capture module 208 may display 608 a device description. For example, the first selection event may include a mouse hover, a right mouse click, or the like.

If the event capture module 208 detects 610 a second selection event, the interface module 210 display 612 an interface to the monitored device 106. The second selection event may include a left mouse click, or the like. In one embodiment, the interface may include a query results field configured to display responses to data queries received from the monitored device 106. In another embodiment, the interface may include a control panel 416 configured to display a selectable control, such as a hyperlink, configured to trigger a communication of data from the monitoring device 102 to the monitored device 106.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a rendering module configured to display a rack image of a physical rack of a plurality of monitored devices, wherein the rack image comprises a physical representation of the physical rack with device representations of each monitored device disposed within the rack image as the monitored device is disposed within the physical rack;

a grid module configured to generate a plurality of grid lines forming a plurality of grid boxes outlining the device representation of each monitored device of the plurality of monitored devices, wherein the grid lines are hidden such that they are not viewable by a user;

a status module configured to display an icon configured to convey information regarding a status of each monitored device of the plurality of monitored devices, wherein the icon is displayed within an area of a plurality of areas defined by a grid box of a plurality of grid boxes outlining the monitored device;

an event capture module configured to monitor a position of a mouse and to highlight those grid lines that define a grid box of a plurality of grid boxes corresponding to the position of the mouse;

a monitor module configured to identify a monitored device at the position of the mouse and configuration data associated with the monitored device, wherein the configuration data defines an area of the rack view associated with the monitored device within an identified grid box;

an interface module configured to display a selectable control triggering an update of firmware and managing communication of data to the identified monitored device within the identified grid box; and wherein the apparatus comprises at least one of hardware and a non-transitory computer-readable medium.

2. The apparatus of claim 1, wherein the device representation of each monitored device further comprises a plurality of display layers, and wherein the status module is configured to display the icon in the first display layer.

3. The apparatus of claim 2, further comprising an event capture module configured to highlight a portion of a second display layer in response to a user selection, the portion of the second display layer corresponding to an area defined by a selected grid box.

4. The apparatus of claim 3, wherein the event capture module is further configured to display a device description in response to detecting a first selection event in the area defined by the selected grid box.

5. The apparatus of claim 3, wherein the event capture module further comprises an interface module configured to display a device interface in response to detecting a second selection event in the area defined by the selected grid box.

6. The apparatus of claim 5, wherein the device interface further comprises a query panel configured to display a response from the monitored device in the area of the selected grid box to an information query to the monitored device.

7. A computer program product comprising a non-transitory computer readable medium having computer usable program code executable to perform operations for displaying a physical view of monitored devices, the operations of the computer program product comprising:

displaying a rack image of a physical rack of a plurality of monitored devices, wherein the rack image is a physical representation of the physical rack with device representations of each monitored device disposed within the rack image as the monitored device is disposed within the physical rack;

generating a plurality of grid lines forming a plurality of grid boxes outlining the device representation of each monitored device of the plurality of monitored device, wherein the grid lines are hidden such that they are not viewable by a user;

displaying an icon configured to convey information regarding a status of each monitored device of the plurality of monitored devices, wherein the icon is displayed within an area of a plurality of areas defined by a grid box of a plurality of grid boxes outlining the monitored device;

monitoring a position of a mouse, and highlighting those grid lines that define the grid box corresponding to the position of the mouse;

identifying a monitored device at the position of the mouse and configuration data associated with the monitored device, wherein the configuration data defines an area of the rack view associated with the monitored device within an identified grid box; and displaying a selectable control triggering an update of firmware and managing communication of data to the identified monitored device within the identified grid box.

8. The computer program product of claim 7, wherein the device representation of each monitored device further comprises a plurality of display layers and the icon is displayed in a first display layer.

9. The computer program product of claim 8, further comprising highlighting a portion of a second display layer in response to a user selection, the portion of the second display layer corresponding to an area defined by a selected grid box.

10. The computer program product of claim 9, further comprising displaying a device description in response to detecting a first selection event in the area defined by the selected grid box.

11. The computer program product of claim 9, further comprising displaying a device interface in response to detecting a second selection event in the area defined by the selected grid box.

12. The computer program product of claim 11, further comprising displaying a response from the monitored device in the area of the selected grid box to an information query to the monitored device.

13. A method for displaying a physical view of a physical device, the method comprising:

displaying a rack image of a physical rack of a plurality of monitored devices on a display device, wherein the rack image is a physical representation of the physical rack with device representations of each monitored device disposed within the rack image as the monitored device is disposed within the physical rack;

generating a plurality of grid lines forming a plurality of grid boxes outlining the device representation of each monitored device of the plurality of monitored devices, wherein the grid lines are hidden such that they are not viewable by a user;

displaying an icon configured to convey information regarding a status of each monitored device of the plurality of monitored devices, wherein the icon is displayed within an area of a plurality of areas defined by a grid box of a plurality of grid boxes outlining the monitored device;

monitoring a position of a mouse, and highlighting those grid lines that define the grid box corresponding to the position of the mouse;

identifying a monitored device at the position of the mouse and configuration data associated with the monitored device, wherein the configuration data defines an area of the rack view associated with the monitored device within an identified grid box; and displaying a selectable control triggering an update of firmware and managing communication of data to the identified monitored device within the identified grid box.

14. The method of claim 13, wherein the device representation of each monitored device further comprises a plurality of display layers and the icon is displayed in a first display layer.

15. The method of claim 14, further comprising highlighting a portion of a second display layer in response to a user selection, the portion of the second display layer corresponding to an area defined by a selected grid box.

16. The method of claim 15, further comprising displaying a device description in response to detecting a first selection event in the area defined by the selected grid box.

17. The method of claim 15, further comprising displaying a device interface in response to detecting a second selection event in the area defined by the selected gird box.

18. The method of claim 17, further comprising displaying a response from the monitored device in the area of the selected grid box to an information query to the monitored device.

\* \* \* \* \*